United States Patent [19]

Uhlmann et al.

[11] Patent Number: 5,144,316
[45] Date of Patent: Sep. 1, 1992

[54] EFFICIENT BATCHED-REPORT GATING TECHNIQUE

[75] Inventors: Jeffrey K. Uhlmann, Alexandria, Va.; Miguel R. Zuniga, Greenbelt, Md.

[73] Assignee: The United States of America as represented by the Secretary of the Navy, Washington, D.C.

[21] Appl. No.: 811,335

[22] Filed: Dec. 20, 1991

[51] Int. Cl.$^5$ ............................................. G01S 13/72
[52] U.S. Cl. .................................. 342/189; 342/195; 342/162; 342/95; 342/96
[58] Field of Search ............... 342/189, 195, 197, 162, 342/36, 56, 74, 75, 76, 90, 95, 96, 97, 145

[56] References Cited

U.S. PATENT DOCUMENTS

| | | | |
|---|---|---|---|
| H1,005 | 12/1991 | Gerlach | 342/378 |
| 4,760,397 | 7/1988 | Piccolruaz | 342/75 |
| 4,829,306 | 5/1989 | Gjessing et al. | 342/159 |
| 4,843,398 | 6/1989 | Houston | 342/47 |
| 4,975,705 | 12/1990 | Gellekink et al. | 342/52 |
| 4,992,795 | 2/1991 | Lassallette et al. | 342/90 |
| 5,047,778 | 9/1991 | Cofield et al. | 342/97 |
| 5,047,784 | 9/1991 | Gerlach et al. | 342/201 |
| 5,061,934 | 10/1991 | Brown et al. | 342/162 |
| 5,068,664 | 11/1991 | Appriou et al. | 342/90 |

OTHER PUBLICATIONS

J. K. Uhlmann et al., "Result of an Efficient Gating Algorithm for Large Scale Tracking Scenarios", Naval Reasearch News, Issue 'One/1991', pp. 24–29.

J. K. Uhlmann et al., "Efficient Approaches for Report/Cluster Correlation in Multitarget Tracking Systems", NRL Report 9281, (Dec. 31, 1990).

Primary Examiner—John B. Sotomayor
Attorney, Agent, or Firm—Thomas E. McDonnell; Edward F. Miles

[57] ABSTRACT

A method and apparatus for generating a track data set corresponding to a plurality of objects. A system employing the invention receives reports, e.g. radar echoes, from the plurality of objects over a time interval, partitions the time interval into subintervals or time bins, and sorts the returns into the time bins. In each bin, the reports are very close to one another in time, so that, in correlating the reports in each bin to the tracks, one can use the reports to form the necessary search tree, rather than using the tracks. Doing so increases efficiency if the number of reports per time interval significantly exceeds the number of tracks.

2 Claims, 2 Drawing Sheets

EFFICIENT BATCHED-REPORT GATING TECHNIQUE

BACKGROUND OF THE INVENTION

Automatic tracking systems are of increasing interest for applications in which one wishes to identify large number of objects, and follow their trajectories over time. Two examples of such applications would be battlefield tracking of missiles and aircraft, and air traffic control. In both applications, a tracking system, such as a radar coupled with other detection and processing equipment, follows a plurality of objects by scanning over a finite time period, and performs tracking by matching the echoes the objects produce from one scan with those from earlier scans.

The simplest way to perform this matching is to record each report received during each scan from each object in the form of a data vector whose components are the information the system can glean from the object, and which the system can record as simple numerical magnitudes. Examples of such data are range, bearing, radar brightness, doppler shift, infrared signature, etc. Report vectors from one scan are sequentially compared with those of the other, the components of the reports being combined according to a preselected mathematical criterion to calculate a measure of "likeness." Pairs of reports from sequential scans which are most "like" one another according to this criterion are identified as belonging to the same object, this pairing being generally called "gating." In this manner, objects are tracked from scan to scan. Because scanning occurs over a known time, and tracking from one scan to another indicates the distance traveled during that time, one can infer kinematic information (velocity and acceleration) using reports from several scans. When a report data set is augmented by kinematic information, the resulting data are referred to as a "track data set," or simply as "tracks."

The sequential comparison of reports in this manner is typically done according to known principles by arranging the report data set from one scan in a search tree, and processing each report from the next scan in the tree.

Although simple in principle, the computation necessary to correlate reports in this manner becomes prohibitively large very quickly. The computational cost necessary to do this correlation is proportional to $N^2$, where N is the number of tracked objects. As the number of objects becomes large, such as on a busy and crowded battlefield or near a congested urban airport, the computational steps necessary to track the objects becomes so large that only a supercomputer could do the calculations quickly enough to be of practical use. The response to this problem was to seek ways to reduce the number of correlations necessary by identifying a priori, and in a computationally efficient way, pairs of reports from sequential scans which have virtually no probability of correlating, and discarding them prior to forming the search tree. Stated another way, one identifies data vectors from sequential scans which are so distant from one another in the parameter space defined by the components of the report data vectors, that there is virtually no likelihood that they are reports from the same object. One determines what is or is not "distant" using analytic geometry and vector analysis to mathematically surround each report by a preselected volume in parameter space. Points within the volume ar deemed "near" the report, those outside are deemed "distant." Hence, reports from two sequential scans whose volumes do not overlap are distant from one another, and may be discarded before forming a search tree.

However, this approach does not eliminate all inefficiencies. The longer the scan period, the greater the uncertainty in each component of the data vectors. Thus as scan time increases, the volumes in parameter space with which one surrounds the reports one must increase nonlinearly to ensure reliable results, the increase being proportional to the order of the vectors. Thus if scan time doubles, and the data vectors have five components, then search time per object increases proportional to $2^5$, i.e. thirty-two fold. In response, one can use kinematic information to "copy" reports from one scan to another, i.e. use kinematics associated with reports from one scan to project those reports to a point in time within the next scan. The reports received in the later scan, and the tracks, are thus moved much closer in time to one another, reducing markedly the volumes in parameter space one must search.

U.S. patent application Ser. No. 07/693,469, by Zuniga et al. discloses a system which further improves computational efficiency by partitioning the scan time into subintervals, copying track data sets sequentially to each subinterval, and updating the track data set at each subinterval. The uncertainty in the tracks and reports are thus much smaller because the time intervals between copies of the tracks is much smaller. Although repeatedly copying the tracks requires additional computations, as the number of objects to be tracked increases, and the order of the data vectors used to track them increases, the savings resulting from increasingly smaller search volumes quickly outweighs the increased cost of repeatedly copying the tracks and repeatedly setting up search trees at each subinterval. Zuniga et al. further discloses how to calculate the tradeoff between these costs, so as to determine the computationally optimal number of subintervals.

As seen from the foregoing, the progression in this art has been from a brute force correlation of reports from scan to scan, to increasingly sophisticated ways of coping track data structures forward to the vicinity in time of new reports, so as to reduce the volumes in parameter space one must search to correlate tracks and reports. A constant, however, has been that tracks are copied, and correlation proceeds by using the tracks to construct a search tree, against which one compares the reports. The reason is that, reports having little or no kinematic information, there is no way to copy reports so as to cluster reports at one time in order to set up a search tree against which to compare tracks. Thus it had been thought that one cannot use reports to construct search trees.

SUMMARY OF THE INVENTION

The invention derives from several insights by the inventors. If one divides a scan into subintervals and copies tracks sequentially to those subintervals, as in Zuniga et al., and uses the copied tracks to set up the search tree at each subinterval, the computational cost of tracking from one scan to another is proportional to:

Cost to set up search tree: $MN_T\log(N_T)$

Cost to copy tracks and perform the search: $N_R(\log N_T + k)$

Where M is the number of subintervals per scan, k is the average number of objects actually found per report, $N_T$ is the number of tracks, and $N_R$ is the number of reports per scan. If, on the other hand, one could find a way to use the reports to form the search trees in the subintervals, the computational cost would be proportional to:

Cost to set up search tree: $M(N_R/M)\log(N_R/m)$

Cost to copy tracks and perform the search: $MN_T\log(N_R/M+k)$

From this, one can see that by setting up one's search trees using the copied tracks, one's computational cost would be proportional to $N_R$, and $\log(N_T)$, i.e. cost would scale disproportionately with the number of reports compared to the number of tracks. On the other hand, if one could use the reports to form the search trees, the dependency on $N_T$ and $N_R$ would reverse. In many tracking situations, the number of reports far exceeds the number of objects to be tracked, an example of which is a congested battlefield, with numerous missiles, aircraft, decoys, not to mention numerous radars and radio transmitters. In such an environment, the number of reports will be huge compared to the number of objects in which one would have any interest in tracking. A specific and important example is combat between fighter aircraft over land. Each aircraft would use radar to track its adversaries, which would typically be only several aircraft. However, the radar echos would have considerable clutter from buildings, montains, and any of a number of other irrelevant structures. Thus despite there being only a few objects of interest, the aircrafts' radars would receive large numbers of reports every scan.

Accordingly, an object of the invention is to increase the computational efficiency of systems used to track objects in an environment in which the number of reports significantly exceeds the number of objects tracked.

Another object is to do this by permitting correlation between track data sets, and report data sets, to proceed by using the report data sets to form search trees, rather than using the track data sets.

In accordance with these and other objects made apparent hereinafter, the invention is generally a method and apparatus which:

generates a track data set corresponding to a plurality of objects;

receives reports from the plurality of objects over a time interval;

partitions the time interval into a preselected number of subintervals;

associates each of the reports with the subinterval corresponding to the time when that report was received; and for at least one subinterval:

copies at least one track to a point in time within the subinterval to form a copied track data set associated with the subinterval;

performs a correlation of the copied track data set with the reports associated with the subinterval. The correlation is done by:

setting up a search structure for the reports associated with the subinterval;

using the search structure, the copied tracks, and a preselected criterion for determining correlation between a track and a report, to perform the correlation;

identifying which members of the copied data set and the associated reports correlate according to the criterion; and updating the track data set responsive to the correlations identified.

By associating the reports with specific subintervals, one has effectively sorted the reports into time bins in which the time difference between reports in each bin is small. This permits one, for practical purposes, to treat the reports as having been received simultaneously. Thus there is no need to copy the reports at all: they are already effectively at the same time. This being so, it is logically irrelevant whether one uses the reports in the subinterval, or tracks copied to the subinterval, to form the search tree; one can use either. That one could use the reports to set up useful search trees was hitherto thought impossible. As applicants have noticed, when reports significantly exceed tracks, doing so saves significant computational cost. Calculations and simulations by the inventors indicate the savings in computational time can be so great that one could do at a computer workstation using the invention what one could formerly do only using a state of the art supercomputer.

These and other objects are further understood from the following detailed description of particular embodiments of the invention. It is understood, however, that the invention is capable of extended application beyond the precise details of these embodiments. Changes and modifications can be made to the embodiments that do not affect the spirit of the invention, nor exceed its scope, as expressed in the appended claims. The embodiments are described with particular reference to the accompanying drawings, wherein:

DETAILED DESCRIPTION

Figure 1:
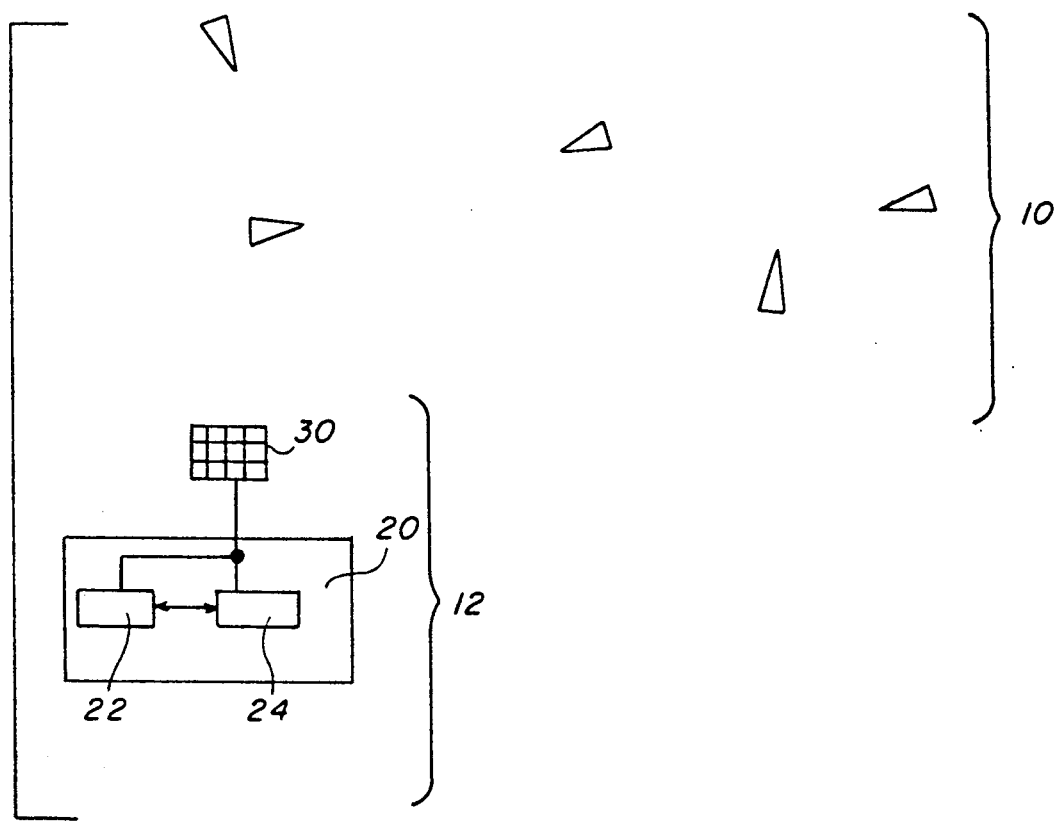
FIG. 1 is a schematic illustrating the environment in which the invention operates.

With reference to the drawing figures, wherein like numbers indicate like parts throughout the several views, FIG. 1 shows a tracking system 12 according to the invention, and illustrates the conditions in which the invention would likely operate. A platform 20 carries a radar antenna 30 which scans a plurality of objects 10, such as missiles, or aircraft. Platform 20 carries signal processing equipment 22, including a digital computer 24, of any of a number of well known kinds necessary for performing the steps set forth in the flow diagram of FIG. 2.

Figure 2:
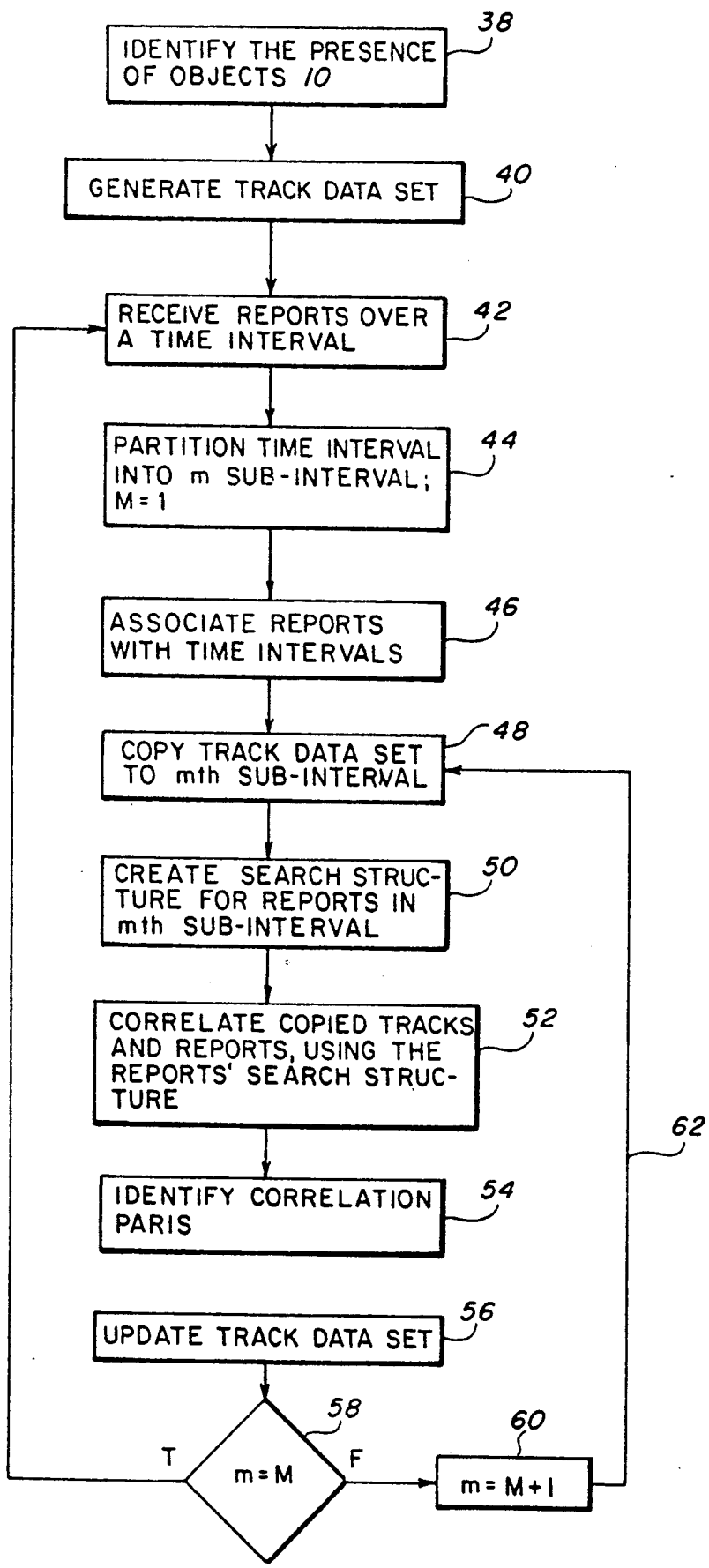
FIG. 2 is a flow diagram illustrating the operation of the invention.

With reference to both FIGS. 1 and 2, tracking system 12 works as follows: antenna 30 scans objects 10 and receives back reports, i.e. radar echoes, from them. These initial reports, like all reports to system 12, arrive during a set time period, here the scan time of antenna 30. The reports indicate the presence of objects 10 to system 12 (denoted by step (38) in FIG. 2). Each report contains information about the range and bearing of objects 10, the time at which system 12 received the report, and could also contain other information available about objects 10, such as radial velocity if system 12 employs doppler radar, or infrared signature if infrared detectors were also available to system 12. Signal processor 22 receives the reports from antenna 30 and converts them into digital form for storage and processing by computer 24. Ultimately, each report is stored in the form of a data vector of dimension d, the magnitude of d being the number of separate pieces of information obtained in the report (e.g., range, bearing, doppler, infrared signature). Computer 24 generates an initial track data set (40) in any known manner, typically either from these initial reports, or from a priori knowledge of what objects system 12 will likely encounter (e.g. a SCUD missile, an EXOCET missile, a Boeing 707 aircraft, etc.).

As antenna 30 again scans, it receives new reports of objects 10 (42). Computer 24 partitions the time during which antenna 30 scanned into M subintervals, numbered m=1, 2, ... M, in the manner described in (application Ser. No. 07/693,469) in effect forming M time bins. Computer 24 sorts the reports, associating each report with the subinterval (time bin) corresponding to the report's time of arrival at system 12 (46). Computer 24 sets a counter m equal to 1 (44), which is used as an index as computer 24 does the following for each subinterval m=1, 2, ..., M:

For each mth subinterval, computer 24 copies the track data set to a preselected time in the first subinterval, typically the subinterval's midpoint (48), i.e. uses the kinematic information in the track data set to project the members of the data set forward in time to the preselected time within the subinterval. The computer then creates a search tree (of any known kind) using the reports associated with the mth subinterval, uses that search tree to correlate the tracks with each report associated with the mth subinterval (52), and identifies pairs of tracks and reports that correlate sufficiently to constitute matches (54). Computer 24 then uses the correlated reports and tracks to update the tracks (56). Computer 24 then queries whether it has done this for all subintervals (58), and, if not, increments counter m (60) and repeats for the next subinterval (62).

The arrangement of FIG. 1, with a ground based scanning radar 20, 30, and a single computer 24 situated locally on site and dedicated to antenna 30, is most practical for uses in remote locations, where other sources of telemetry, i.e. reports, are unavailable. This would be the case if the invention were employed for air traffic control at a remote airfield, or for local anti-missile or anti-aircraft fire control. However, the invention could as readily be practiced by using a computer disposed at one location, and at which the computer receives reports relayed from a number of distant locations. This would be the case if the invention were used for centralized battle management, such as in an AWACS plane, or at a ground command center, each of which would have communications links to a large number of radars, infrared sensors, etc., all of which could be fed to the command center or AWACS plane for processing. Here, the time period between reports would be unrelated to any formal scanning mechanism, but rather would be a set time between which the central system processor accepts reports from its multiple sources. This would similarly be the case were the invention used for air traffic control in a congested urban area, which would likely have a number of radars in place to feed information to a central control location.

Indeed, although the forgoing discusses the invention in conjunction with a radar system, this too is done for purposes of illustration rather than limitation. The invention is useful with any set of sensors that can collect reports from objects which one may wish to track, several other examples of which are infrared sensors, and sonar sensors.

The invention has been described in what is considered to be the most practical and preferred embodiments. It is recognized, however, that obvious modifications to these particular embodiments may occur to those with skill in this art. As one example of this, the sequence of steps given above is for purposes of explanation and illustration, rather than limitation. The scope of the invention is to be discerned solely by reference to the appended claims, wherein:

We claim:

1. A method for tracking a plurality of objects, said method comprising steps for:

generating a track data set;

receiving reports from said plurality of objects over a time interval;

partitioning said time interval into a preselected number of subintervals;

associating each of said reports with the subinterval corresponding to the time said each of said reports was received in said step for receiving; and for at least one subinterval of said preselected number of subintervals:

copying at least one track of said track data set to a point in time within said at least one subinterval to form a copied track data set associated with said at least one subinterval;

performing a correlation of said copied track data set with said reports associated with said at least one subinterval, said correlation comprising steps for:

setting up a search structure for said reports associated with said at least one of said subintervals;

using said search structure, said copied tracks, and a preselected criterion for determining correlation between a track and a report, to perform said correlation;

identifying which members of said copied data set and said associated reports correlate according to said criterion;

updating said track data set responsive to said step for identifying.

2. A apparatus for tracking a plurality of objects, comprising:

means for generating a track data set;

means for receiving reports from said plurality of objects over a time interval;

means for partitioning said time interval into a preselected number of subintervals;

means for associating each of said reports with the subinterval corresponding to the time said each of said reports was received by said means for for receiving; and means, effective for at least one subinterval of said preselected number of subintervals, for:

copying at least one track of said track data set to a point in time within said at least one subinterval to form a copied track data set associated with said at least one subinterval;

performing a correlation of said copied track data set with said reports associated with said at least one subinterval, said correlation comprising steps for:

setting up a search structure for said reports associated with said at least one of said subintervals;

using said search structure, said copied tracks, and a preselected criterion for determining correlation between a track and a report, to perform said correlation;

identifying which members of said copied data set and said associated reports correlate according to said criterion;

updating said track data set responsive to said step for identifying.

* * * * *